United States Patent [19]

Johnson

[11] 4,389,969
[45] Jun. 28, 1983

[54] GLUE DETECTOR

[75] Inventor: Keith R. Johnson, Orland Park, Ill.

[73] Assignee: Copar Corporation, Oak Lawn, Ill.

[21] Appl. No.: 275,997

[22] Filed: Jun. 22, 1981

[51] Int. Cl.³ .......................... B05C 5/02; B05C 11/00
[52] U.S. Cl. ..................................... 118/665; 118/669; 118/713
[58] Field of Search ............... 118/665, 712, 713, 714, 118/669, 410; 324/61 R

[56] References Cited

U.S. PATENT DOCUMENTS

| | | | |
|---|---|---|---|
| 3,713,966 | 1/1973 | Lippke | 324/61 R X |
| 4,164,001 | 8/1979 | Patnaude | 118/684 X |
| 4,167,151 | 9/1979 | Muraoka et al. | 118/665 |

*Primary Examiner*—John P. McIntosh
*Attorney, Agent, or Firm*—Kinzer, Plyer, Dorn & McEachran

[57] ABSTRACT

A means for detecting the application of glue to a defined area of a moving box blank includes a capacitance device, one plate of which is formed by a sensing surface positioned adjacent the path of box blank movement, with the other plate being formed by the defined area of the box blank and the applied glue. There are means for applying an electric signal to the sensing surface and means for sensing variations in said signal caused by the presence or absence of glue. There is a control circuit for enabling the detector, which control circuit enables the detector after a glue application and after a period of delay consistent with movement of the box blank from the glue applicator to the detector.

8 Claims, 5 Drawing Figures

GLUE DETECTOR

SUMMARY OF THE INVENTION

The present invention relates to the manufacture of corrugated box blanks and in particular to means for detecting the application of glue to the glue flap or glue area of the box blank.

A primary purpose of the invention is a glue detector utilizing a capacitance device, one plate of which is formed by the glue area itself.

Another purpose is a glue detector for use in connection with a glue applicator applying glue to moving corrugated box blanks, which detector is controlled to be enabled at a point in time wherein the glue area should be directly adjacent the detector.

Another purpose is a glue detector and control means therefor usable in conjunction with a glue applicator, which control means enables the detector a period of time after glue application and consistent with moving of the glue area from the applicator to the detector.

Another purpose is a glue detector consisting of a capacitance type device, one plate of which is formed by a sensing surface positioned directly adjacent the path of movement of box blanks, with the other plate of the capacitance device being formed by the glue area.

Another purpose is a glue detector, which is sensitive to the presence of the moisture in an applied glue area.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

One of the main causes of product rejection by customers of manufacturers of corrugated boxes or folding boxes is the failure of the manufacturers' automatic glue system to deposit the correct amount of glue in the correct area which will enable the box folding equipment to fold the box blank into a closed, flattened tube prior to shipment. In U.S. patent application Ser. No. 030,469 assigned to the assignee of the present application there is disclosed a glue control which deposits glue of a preset length and width to a corrugated or folding box blank just prior to its being formed into a closed tube, by the folding section of the box making machine. The glue control utilizes a photoelectric sensor for detecting the leading edge of a box blank, a pulse generator which produces pulse signals for each increment of board travel, and a control which provides signals for actuating a glue valve to deposit glue in a predetermined area. The glue detector described herein uses the same signals to sense when the desired glue pattern, preset by the operator, has actually being deposited on the box blank.

Improper gluing can take a number of forms. There is the case where there is no application of glue which means that the box blank has not been formed into a permanent tube and therefore is scrap. The glue may be improperly placed which usually results in a poor joint, or if offset very often causes the flattened tube to adhere to the opposite side of the tube so that the tube cannot be opened to the proper shape. If too much glue is applied, such glue will squeeze out of the joint and cause sticking to adjoining boxes or to the opposite side of the tube so again the tube cannot be formed into a tubular shape. If too little glue is applied the joint will open up under the stress of filling or later during shipping. The present invention will be described in connection with a glue applicator which extrudes glue. It should be understood that the concepts described are equally applicable to glue applied by other means, for example by spraying.

Figure 1:
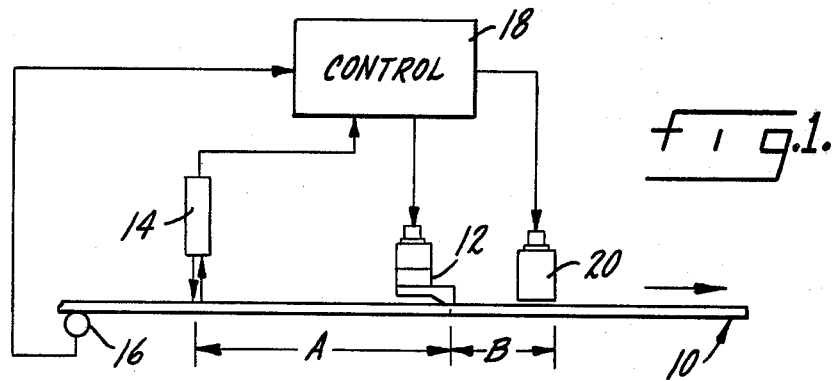
FIG. 1 is a diagrammatic illustration of a means for applying glue to a moving box blank with the glue detector positioned adjacent thereto.

In FIG. 1 a path of box movement is indicated generally at 10 and may typically be a conveyor or some form of mechanical device which will move boxes along a predetermined path at a controlled speed. A glue applicator or glue valve is indicated at 12 and is spaced a distance A from a photodetector 14. A pulse generator 16 is positioned adjacent the path of movement of conveyor 10 and will provide pulses at a predetermined rate depending upon movement of the conveyor and thus movement of the box blanks. The pulse generator is electrically connected to a control circuit 18 as is the photodetector 14 and the glue valve 12. A glue detector 20 is positioned a distance B from glue valve 12 and is also electrically connected to the control 18.

As explained in detail in the above-described copending application, once the detector 14 senses the presence of a box blank it will enable certain counting circuits in control 18 which receive pulses from pulse generator 16. After a predetermined number of pulses the glue valve 12 will be operated to apply glue to the correct location on the box blank. Similarly, the glue detector 20 will be enabled a predetermined number of pulse generator counts subsequent to application of glue so that when the detector is enabled the glue area is located directly adjacent thereto.

Figure 2:
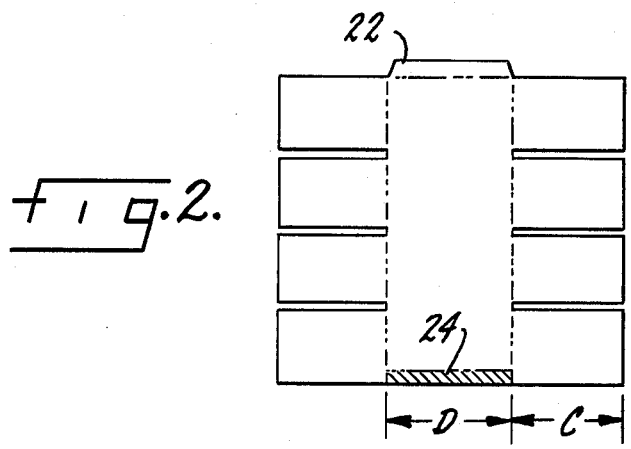
FIG. 2 is a diagrammatic illustration of a typical box blank including the area or areas for glue application.

FIG. 2 illustrates a typical box blank with a tab indicated at 22, which may in some applications receive glue. The more usual area for glue application is indicated by the shaded area 24.

Looking at FIGS. 1 and 2 in combination, as a box blank moves from left to right, photodetector 14 initially detects the leading edge of the box or the flaps of the box. When the blank has traveled distance A, the glue applicator is then positioned over the leading edge of the box. When the blank has moved an additional distance C, illustrated in FIG. 2, the glue control actuates the glue valve, as described in the above-mentioned application, and glue is applied through the distance D. After the box blank has moved the distances A plus B plus C, the distance B representing the distance from the glue valve to the glue detector, the glue detector will be enabled and will normally sense the presence of glue if the glue has been applied in the proper area on the box blank.

Figure 3:
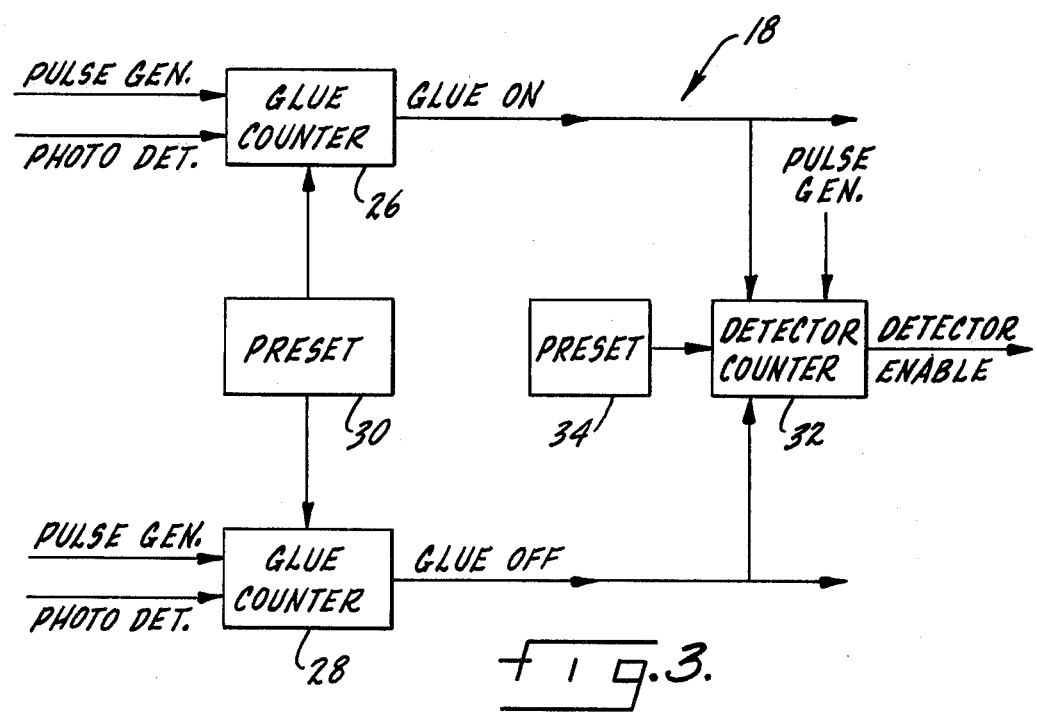
FIG. 3 is a diagrammatic illustration of the control means shown in FIG. 1.

Looking at FIG. 3, which is a diagrammatic illustration of control 18, a first glue counter is indicated at 26 and a second glue counter is indicated at 28. The preset number of counts, representative of the distance between detector 14 and the glue valve, or distance A, and flap width C, is represented by a preset box 30. Glue counters 26 and 28 each receive inputs from pulse generator 16 and detector 14 as indicated on the drawing. Each of the counters have an output, with that from counter 26 being effective to initiate application of glue or a glue turn-on signal, whereas, the output from counter 28 is a glue turn-off signal. As described in the above-mentioned application, counter 26 will begin counting upon a signal from detector 14 indicating the detection or presence of a box blank. After a predetermined number of pulses from pulse generator 16, as determined by preset 30, the counter will enable the glue applicator. Counter 28 operates in a similar manner to turn off the glue applicator, in this case detector 14 sensing the trailing edge of the box. The glue on and glue off signals shown in FIG. 3 will turn glue valve 12 on and off as described.

The control circuit also includes a detector counter 32 having a preset number of counts represented by box 34. Detector counter 32 receives inputs of the glue on and glue off signals and an input from pulse generator 14. The output from counter 32 is a detector enable signal which is effective to turn on and turn off glue detector 20.

In operation, detector-counter 32 will first receive a glue on signal after which it will begin counting pulses from pulse generator 16 to the preset number in box 34, which number is indicative or representative of distance B or the distance from the glue valve to the glue detector. In other words, the detector is to be enabled after the box has moved from the applicator to the detector and movement of the box blanks through distance B is represented by the preset number of counts 34. In like manner, the detector will be disabled a predetermined number of counts after the glue off signal from counter 28. Since the distance is the same, the detector disable signal from counter 32 will again count a predetermined number of counts, represented by box 34, after the glue off signal.

Figure 4:
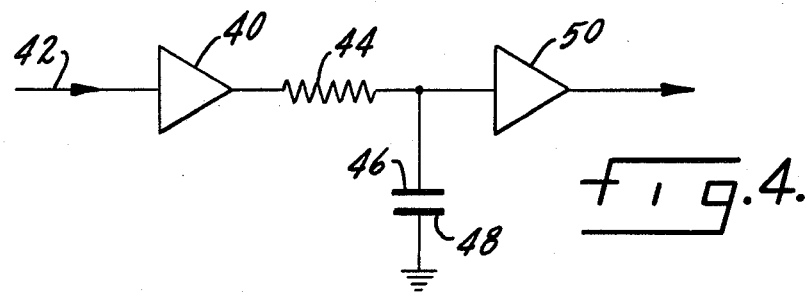
FIG. 4 is a diagrammatic illustration of the sensing device used to detect the presence of glue.

As indicated above, the sensing device itself is capacitive in nature or electrostatic in concept and includes one plate which will receive an electrical signal with the other plate of the capacitance device being provided by the area of applied glue, specifically the moisture within the glue. FIG. 4 diagrammatically illustrates the manner in which the capacitance sensing device operates. A buffer-amplifier is indicated at 40 and will receive a constant frequency signal along input line 42. The output of buffer-amplifier 40 is connected to a resistive element 44 which in turn is connected to a sensing surface 46. The opposite plate of the capacitance device is diagrammatically illustrated at 48 and represents the glue area on the moving box blank. The RC circuit provides an input for a buffer-amplifier 50, whose output is a signal attenuated from the input to amplifier 40, with the amount of attenuation being representative of the change in capacitance provided by the described sensing device, with the change in capacitance being directly related to the application of glue to a defined area on the moving box blank.

Figure 5:
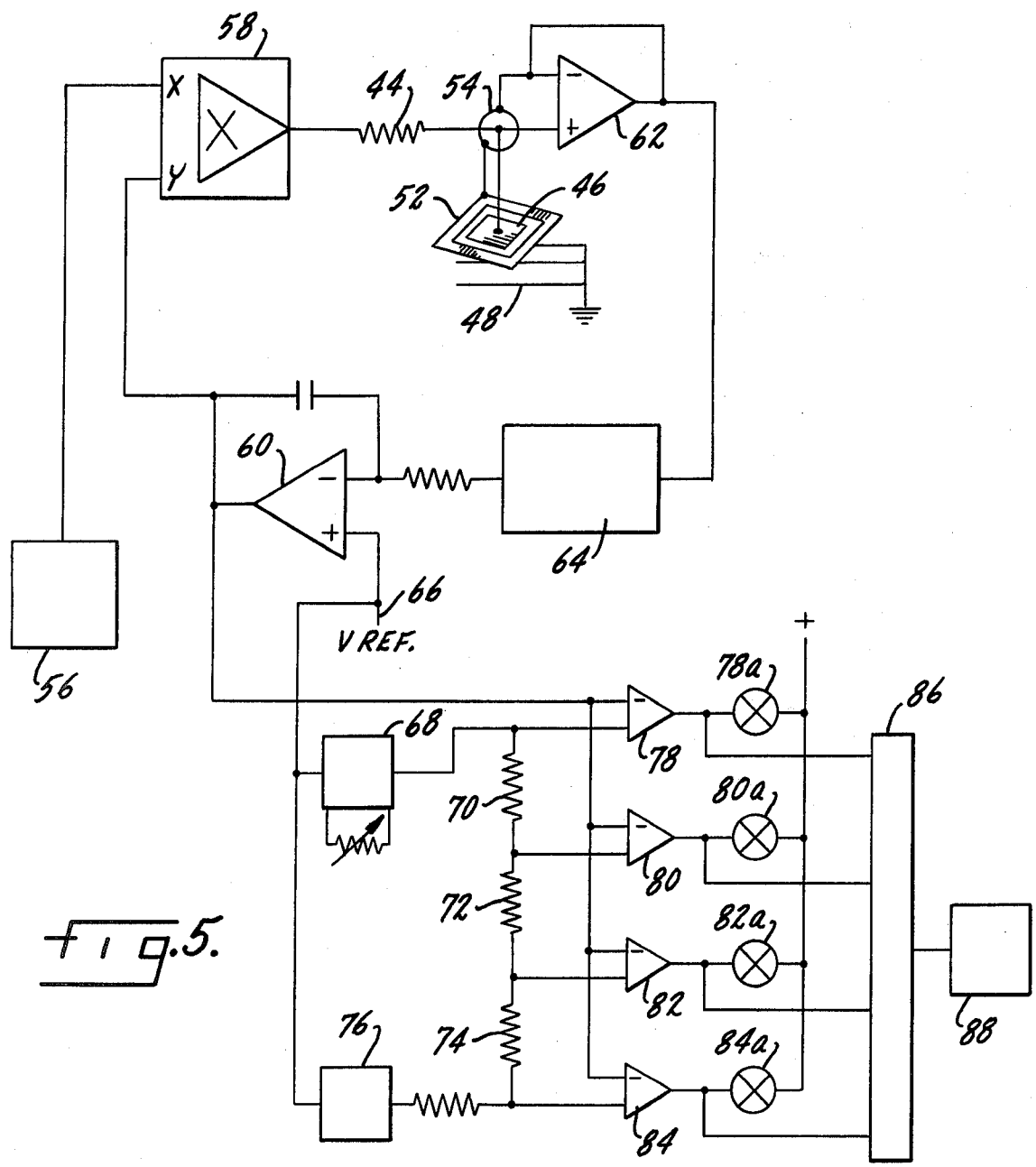
FIG. 5 is an electrical schematic illustrating the sensing device.

A specific circuit utilizing the capacitive sensing concept is illustrated in FIG. 5. The sensing device includes the described sensor plate or sensor surface 46 and the described glue area 48, as well as a peripherally positioned driven guard 52. Both sensing plate 46 and guard 52 will receive a signal of the same potential, but these elements are electrically isolated from one another by the connection diagrammatically illustrated at 54. It is important to have a driven guard of the type described inasmuch as changes in capacitance on the order of 0.05 pf are being measured by the sensor. Stray capacitance within the described circuit elements can amount to 3.0 pf and thus it is essential that any fixed interval capacitance or extraneous surfaces be minimized or isolated and this is accomplished by maintaining the same potential at the driven guard as is on the sensor plate and by maintaining electrical isolation between these elements.

A 100 KHz oscillator 56 may provide a 20 volt electric signal for the capacitance sensor. It should be understood that the frequency and voltage are representative only. Oscillator 56 provides one input for an analog multiplier 58. The other input for multiplier 58 is provided by an error integrator indicated diagrammatically at 60. The output from multiplier 58 is connected to resistor 44. A preamplifier 62 is connected to a peak detector 64 as it is the peaks of the applied signal which will be detected to determine variations in capacitance. Peak detector 64 provides one input for error integrator 60, with the other input being provided by a reference voltage 66 which, for purposes of illustration, has been shown to be 2.5 volts. The analog multiplier, preamplifier, peak detector and error detector form a closed loop control. This circuit is effective to maintain a relatively constant voltage at the sensor plate of the capacitance device.

Reference voltage 66 is also applied to a voltage divider network illustrated by a variable resistance 68, three series-connected resistors 70, 72 and 74 and a second variable resistance 76. The error voltage from integrator 60 is connected to and forms one input for operational amplifiers indicated at 78, 80, 82 and 84, respectively. The other inputs for each of the operational amplifiers is provided by the voltage divider network. Thus, the operational amplifiers will provide output signals depending upon the amount of glue that is actually applied to an area of a moving box blank. Not only does the detector sense the presence or absence of glue at the proper location, but the amount of glue is similarly sensed by means of the moisture in the specific area directly adjacent sensing plate 46. The operator may thus readily determine if his machine is operating properly. For example, the operator may determine that an amount of glue above a predetermined minimum is considered satisfactory for gluing purposes and similarly that amounts of glue above a predetermined maximum constitute an overapplication of glue. The sensing circuit shown, with the described indicators 78a, 80a, 82a and 84a may provide the operator will visual indications of the amounts of glue applied to specific blanks. The operational amplifier outputs are also connected to a counter/discrimination logic circuit 86, which logic circuit is connected to a readout device 88 which will provide the operator with a ready indication of the number of correct blanks, the number of incorrect blanks, and an instant indication of improperly glued blanks. The glue apparatus is directly under the control of the operator and any required variations in glue application may easily be made.

The detector circuit illustrated in FIG. 5 and diagrammatically described in FIG. 4 is enabled and disabled by the control circuit of FIG. 3. Although the terms enable and disable are used, in practice the detector circuit is always in a functional state. In reality what is enabled or disabled is the readout devices. What is important is that the readout device actually indicate what the detector is sensing at the precise time period when the glue area should be adjacent the detector. It is for that reason that the counting detector 32 is utilized in the arrangement of FIG. 3 and the preset number of counts is provided to take into account movement of the blank from the glue applicator to the glue detector. The readout or indication of the presence or absence of glue must be made at the correct instant of time or otherwise it would be meaningless. If for example an indication of no glue was provided by the detector, but at the wrong time period, this would provide the operator with no meaningful information. Thus, it is important to enable the detector at the time frame when the glue area should be directly adjacent to it.

It is also important to provide an indication of the amount of glue present at that time period and it is this information that is provided by the circuit of FIG. 5. The actual number of operational amplifiers and hence the number of indicators can be varied, depending upon the sensitivity of the device or, depending upon how close the operator wishes to monitor the amount of glue which is being applied to the correct areas of the box blank.

Whereas the preferred form of the invention has been shown and described herein, it should be realized that there may be many modifications, substitutions and alterations thereto.

The embodiments of the invention in which an exclusive property or privilege is claimed are defined as follows:

1. Means for detecting the application of glue to a defined area of a moving box blank including a capacitance device, one plate of which is formed by a sensing surface positioned adjacent the path of box blank movement, said sensing plate including a guard element, electrically isolated from said sensing plate, the other plate of said capacitance device being formed by the defined area of the box blank and the applied glue, means for applying an electrical signal to said sensing surface and guard element, with the signal applied to the guard element eliminating the effects of stray circuit capacitance on variations in said signal, and means for sensing variations in said signal caused by the presence or absence of glue.

2. The sensing means of claim 1 further characterized in that said guard element is positioned peripherally about the conductive area of said sensing plate.

3. The structure of claim 1 further characterized by and including control means for enabling said means for sensing variations in response to the application of glue to the moving box blanks.

4. The structure of claim 3 further characterized in that said control means includes a counter, which counter receives an input from a pulse generator providing pulses representative of movement of a box blank, said counter being enabled upon the application of glue and in turn enabling said sensing means after a predetermined number of pulse generator input pulses, representative of movement of the glue area from a glue applicator to the capacitance device.

5. The structure of claim 4 further characterized in that said control means further includes means for terminating enablement of said sensing means a predetermined number of counts after the termination of glue application which predetermined number of counts represents movement of the box blank from the glue applicator to the capacitance sensing device.

6. Means for detecting the application of glue to a defined area of a moving box blank including a detector to be positioned adjacent a moving box blank and sensitive to the presence or absence of glue on a moving box blank, control means connected to said detector for enabling said detector and including a counting circuit having one electrical input indicating the application of glue and a second electrical input representing movement of a box blank from the glue applicator to the detector.

7. The detecting means of claim 6 further characterized in that said counting circuit enables said detector after a predetermined number of counts from said second electrical input representing movement of a box blank.

8. The detecting means of claim 6 further characterized in that said counting circuit receives an electrical input indicating termination of the application of glue and terminates the enablement of said detector a predetermined number of counts after termination of the glue application, with said predetermined number of counts representing movement of the box blank from the glue applicator to the detector.

* * * * *